(12) United States Patent
Kuvshinnikova et al.

(10) Patent No.: US 7,728,056 B2
(45) Date of Patent: Jun. 1, 2010

(54) WEATHERABLE RESINOUS COMPOSITIONS WITH LOW HEAT STORAGE AND METHOD

(75) Inventors: Olga I. Kuvshinnikova, Glenmont, NY (US); Nela Stafie, Breda (NL); Bimal R. Patel, Selkirk, NY (US)

(73) Assignee: SABIC Innovative Plastics IP B.V. (NL)

( * ) Notice: Subject to any disclaimer, the term of this patent is extended or adjusted under 35 U.S.C. 154(b) by 56 days.

(21) Appl. No.: 11/562,147

(22) Filed: Nov. 21, 2006

(65) Prior Publication Data

US 2007/0129482 A1 Jun. 7, 2007

Related U.S. Application Data

(63) Continuation-in-part of application No. 11/294,126, filed on Dec. 5, 2005, now abandoned.

(51) Int. Cl.
*C08K 5/3445* (2006.01)
*C08K 5/16* (2006.01)
*C08K 3/22* (2006.01)

(52) U.S. Cl. .......................... 524/94; 524/186; 524/407

(58) Field of Classification Search .................. 524/84, 524/96, 112, 94, 186, 407
See application file for complete search history.

(56) References Cited

U.S. PATENT DOCUMENTS

| 3,711,575 | A | 1/1973 | Kakefuda et al. |
|---|---|---|---|
| 3,944,631 | A | 3/1976 | Yu et al. |
| 4,731,414 | A | 3/1988 | Ting |
| 4,831,079 | A | 5/1989 | Ting |
| 6,366,397 | B1 | 4/2002 | Genjima et al. |
| 6,521,038 | B2 | 2/2003 | Yanagimoto et al. |
| 6,559,270 | B1 | 5/2003 | Siclovan et al. |
| 6,822,041 | B2 | 11/2004 | Schottland et al. |
| 2003/0177943 | A1* | 9/2003 | Auweter et al. .......... 106/31.28 |
| 2004/0044119 | A1* | 3/2004 | Etzrodt et al. ............... 524/543 |
| 2004/0225069 | A1* | 11/2004 | Berzinis et al. ............. 525/308 |
| 2006/0000392 | A1* | 1/2006 | Reisacher et al. ........... 106/499 |

FOREIGN PATENT DOCUMENTS

| EP | 1162175 | 12/2001 |
|---|---|---|
| EP | 1541636 | 6/2005 |
| WO | WO 2004/046251 | * 6/2004 |
| WO | 2005/000938 | 1/2005 |

OTHER PUBLICATIONS

Plastics Additives Handbook Zweifel, Hans. Hanser Gardner Publications, Cincinati. 5$^{th}$ Edition (2001). p. 852-857.*
Search Report—PCT/US2006/046186—Apr. 12, 2006.
Written Opinion—PCT/US2006/046186—Apr. 12, 2006.
R.F. Brady and L. V. Wake, "Principles and Formulation for Organic Coatings with Tailored Infrared Properties" in Progress in Organic Coatings, 20, 1992.
U.S. Appl. No. 08/962,458, filed Oct. 31, 1997.
U.S. Appl. No. 10/748,394, filed Dec. 30, 2003.

* cited by examiner

*Primary Examiner*—Milton I Cano
*Assistant Examiner*—John Uselding

(57) ABSTRACT

Disclosed are resinous compositions comprising a colorant combination comprising at least one inorganic infrared reflecting pigment and at least one organic colorant, wherein the combination of inorganic pigment and organic colorant results in a molded part with an L* value of less than about 30 with specular component included, and a heating build-up (HBU) as measured according to ASTM D4803-89 of less than about 34° C. A method to make such compositions is also an embodiment of the invention as are articles made from such compositions.

16 Claims, No Drawings

WEATHERABLE RESINOUS COMPOSITIONS WITH LOW HEAT STORAGE AND METHOD

CROSS-REFERENCE TO RELATED APPLICATIONS

This application is a continuation-in-part of application Ser. No. 11/294,126, filed Dec. 5, 2005, and abandoned Feb. 12, 2009, which is incorporated herein by reference.

BACKGROUND

The present invention relates to a resinous composition comprising a combination of organic and inorganic colorants which composition has good color and low heat accumulating properties, and a method to make such a composition.

Dark colors are associated with hot temperatures. In dark colored plastic articles high temperature often leads to surface deformation, cracking, and expansion under solar radiation. Use of inorganic infrared reflecting (IRR) pigments has been described for example in R. F. Brady and L. V. Wake, "Principles and Formulation for Organic Coatings with Tailored Infrared Properties" in Progress in Organic Coatings, 20, 1992. While infrared (IR) reflective pigments provide benefits against thermal distortion and expansion problems, the achievable color space is limited to medium dark colors. For example a jet black color is not achievable in plastic articles with IR reflective pigments. In particular deep dark color (dark brown, dark green, dark blue, dark red and black) with L* value below 40 is not achievable in plastic articles by use of just IRR pigments. To obtain desired jetness (dark colors with L value below 30), a organic colorants have also been included in the compositions as described in U.S. Pat. No. 6,822,041. The disadvantage is that the organic colorants are known to have poor resistance to solar radiation and consequently have poor weathering properties.

In U.S. Pat. No. 6,366,397 a dark color is achieved in a plastic article using a multilayer system. A coating arrangement is described therein which has a higher reflection of sunlight in the IR range. A disadvantage here is that the arrangement must consist of two layers to function effectively. A white layer having high solar reflectance is required as the first or base layer. A darker colored layer is then applied onto this base layer. The disadvantage here is not only that two layers must be applied to achieve a dark surface having low solar absorption, but also that if damage occurs to the dark outer layer, a white layer then appears which will disturb the dark appearance. EP 1541636 describes the use of a combination of two inorganic pigments to obtain a low thermal storage thermoplastic resin with weather resistance and shock resistance properties.

It remains of interest, therefore, to develop compositions for plastic articles which have low L* value and also good resistance to solar radiation.

BRIEF DESCRIPTION

The present inventors have discovered compositions for plastic articles which have low L* value and also good resistance to solar radiation. In one embodiment the present invention is a composition comprising: (i) at least one resin selected from the group consisting of (i-a) a rubber modified thermoplastic resin comprising a discontinuous elastomeric phase dispersed in a rigid thermoplastic phase, wherein at least a portion of the rigid thermoplastic phase is grafted to the elastomeric phase; and wherein the elastomeric phase comprises a polymer having structural units derived from at least one ($C_1$-$C_{12}$)alkyl(meth)acrylate monomer; and wherein the rigid thermoplastic phase comprises structural units derived from at least one vinyl aromatic monomer and at least one monoethylenically unsaturated nitrile monomer, (i-b) a copolymer comprising carbonate structural units, and (i-c) a blend comprising a polycarbonate and at least one other resin different from polycarbonate; and (ii) a colorant combination comprising (ii-a) at least one inorganic infrared reflecting pigment and (ii-b) at least one organic colorant, wherein the combination of the inorganic pigment and organic colorant results in a molded part with a heating build-up (HBU) as measured according to ASTM D4803-89 of less than or equal to about 34° C. and an L* value of less than about 30 with specular component included or less than about 20 with specular component excluded.

In another embodiment the present invention is a method for preparing an article comprising at least one resin selected from the group consisting of (i-a) a rubber modified thermoplastic resin comprising a discontinuous elastomeric phase dispersed in a rigid thermoplastic phase, wherein at least a portion of the rigid thermoplastic phase is grafted to the elastomeric phase; and wherein the elastomeric phase comprises a polymer having structural units derived from butyl acrylate; and wherein the rigid thermoplastic phase comprises structural units derived from styrene, acrylonitrile, and optionally methyl methacrylate, (i-b1) a copolymer comprising carbonate structural units derived from bisphenol A and ester structural units derived from a mixture of isophthalic acid, terephthalic acid, and resorcinol, (i-b2) a copolymer comprising carbonate structural units derived from bisphenol A and dimethyl siloxane structural units, and (i-c1) a blend comprising a polycarbonate and a polyester selected from the group consisting of poly(butylene terephthalate), poly(ethylene terephthalate), poly(cyclohexanedimethanol-ethylene glycol terephthalate), poly(cyclohexylenedimethylene-cyclohexanedicarboxylate), and a polyester with structural units derived from a mixture of isophthalic acid, terephthalic acid, and resorcinol; and (i-c2) a blend comprising a polycarbonate and a rubber modified thermoplastic resin selected from the group consisting of ABS, ASA, and MMA-ASA, wherein the article has a heating build-up (HBU) as measured according to ASTM D4803-89 of less than or equal to about 34° C. and an L* value of less than about 30 with specular component included or less than about 20 with specular component excluded; which method comprises the step of combining the resin with a colorant combination comprising an inorganic infrared reflecting pigment and at least two organic colorants, wherein the inorganic infrared reflecting pigment is selected from the group consisting of a chromium iron oxide, a black spinel, and chrome iron nickel black spinel, and is present in an amount greater than or equal to about 0.02 phr; and wherein the organic colorant comprises at least two colorants selected from the group consisting of Solvent Green 3, Solvent Red 135, Solvent Violet 13, Pigment Blue 15:4, Pigment Black 31, Disperse Violet 31/26, and mixtures thereof, and is present in a total amount greater than or equal to about 0.002 phr.

Embodiments of the invention also include articles comprising the compositions. Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise. The terminology "monoethylenically unsaturated" means having a single site of ethylenic unsaturation per molecule. The terminology "polyethylenically unsaturated" means having two or more sites of ethylenic unsaturation per molecule. The terminology "(meth) acrylate" refers collectively to acrylate and methacrylate; for example, the term "(meth)acrylate monomers" refers collectively to acrylate monomers and methacrylate monomers. The term "(meth)acrylamide" refers collectively to acrylamides and methacrylamides; for example, the term "(meth) acrylamide monomers" refers collectively to acrylamide monomers and methacrylamide monomers.

The term "alkyl" as used in the various embodiments of the present invention is intended to designate linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. Alkyl groups may be saturated or unsaturated, and may comprise, for example, vinyl or allyl. The term "alkyl" also encompasses that alkyl portion of alkoxide groups. In various embodiments normal and branched alkyl radicals are those containing from 1 to about 32 carbon atoms, and include as illustrative non-limiting examples $C_1$-$C_{32}$ alkyl (optionally substituted with one or more groups selected from $C_1$-$C_{32}$ alkyl, $C_3$-$C_{15}$ cycloalkyl or aryl); and $C_3$-$C_{15}$ cycloalkyl optionally substituted with one or more groups selected from $C_1$-$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. The term "aryl" as used in the various embodiments of the present invention is intended to designate substituted or unsubstituted aryl radicals containing from 6 to 20 ring carbon atoms. Some illustrative non-limiting examples of these aryl radicals include $C_6$-$C_{20}$ aryl optionally substituted with one or more groups selected from $C_1$-$C_{32}$ alkyl, $C_3$-$C_{15}$ cycloalkyl, aryl, and functional groups comprising atoms selected from Groups 15, 16 and 17 of the Periodic Table. Some particular illustrative examples of aryl radicals comprise substituted or unsubstituted phenyl, biphenyl, tolyl, naphthyl and binaphthyl.

In one embodiment resinous compositions of the present invention comprise a rubber modified thermoplastic resin comprising a discontinuous elastomeric phase dispersed in a rigid thermoplastic phase, wherein at least a portion of the rigid thermoplastic phase is grafted to the elastomeric phase. The rubber modified thermoplastic resin employs at least one rubber substrate for grafting. The rubber substrate comprises the discontinuous elastomeric phase of the composition. There is no particular limitation on the rubber substrate provided it is susceptible to grafting by at least a portion of a graftable monomer. In some embodiments suitable rubber substrates comprise dimethyl siloxane/butyl acrylate rubber, or silicone/butyl acrylate composite rubber; polyolefin rubbers such as ethylene-propylene rubber or ethylene-propylene-diene (EPDM) rubber; or silicone rubber polymers such as polymethyl siloxane rubber. The rubber substrate typically has a glass transition temperature, Tg, in one embodiment less than or equal to 25° C., in another embodiment below about 0° C., in another embodiment below about minus 20° C., and in still another embodiment below about minus 30° C. As referred to herein, the Tg of a polymer is the T value of polymer as measured by differential scanning calorimetry (DSC; heating rate 20° C./minute, with the Tg value being determined at the inflection point).

In one embodiment the rubber substrate is derived from polymerization by known methods of at least one monoethylenically unsaturated alkyl (meth)acrylate monomer selected from $(C_1$-$C_{12})$alkyl(meth)acrylate monomers and mixtures comprising at least one of said monomers. As used herein, the terminology "$(C_x$-$C_y)$", as applied to a particular unit, such as, for example, a chemical compound or a chemical substituent group, means having a carbon atom content of from "x" carbon atoms to "y" carbon atoms per such unit. For example, "$(C_1$-$C_{12})$alkyl" means a straight chain, branched or cyclic alkyl substituent group having from 1 to 12 carbon atoms per group. Suitable $(C_1$-$C_{12})$alkyl(meth)acrylate monomers include, but are not limited to, $(C_1$-$C_{12})$alkyl acrylate monomers, illustrative examples of which comprise ethyl acrylate, butyl acrylate, iso-pentyl acrylate, n-hexyl acrylate, and 2-ethyl hexyl acrylate; and their $(C_1$-$C_{12})$alkyl methacrylate analogs, illustrative examples of which comprise methyl methacrylate, ethyl methacrylate, propyl methacrylate, isopropyl methacrylate, butyl methacrylate, hexyl methacrylate, and decyl methacrylate. In a particular embodiment of the present invention the rubber substrate comprises structural units derived from n-butyl acrylate.

In various embodiments the rubber substrate may also optionally comprise a minor amount, for example up to about 5 wt. %, of structural units derived from at least one polyethylenically unsaturated monomer, for example those that are copolymerizable with a monomer used to prepare the rubber substrate. A polyethylenically unsaturated monomer is often employed to provide cross-linking of the rubber particles and/or to provide "graftlinking" sites in the rubber substrate for subsequent reaction with grafting monomers. Suitable polyethylenically unsaturated monomers include, but are not limited to, butylene diacrylate, divinyl benzene, butene diol dimethacrylate, trimethylolpropane tri(meth)acrylate, allyl methacrylate, diallyl methacrylate, diallyl maleate, diallyl fumarate, diallyl phthalate, triallyl methacrylate, triallyl cyanurate, triallyl isocyanurate, the acrylate of tricyclodecenylalcohol and mixtures comprising at least one of such monomers. In a particular embodiment the rubber substrate comprises structural units derived from triallyl cyanurate.

In some embodiments the rubber substrate may optionally comprise structural units derived from minor amounts of other unsaturated monomers, for example those that are copolymerizable with a monomer used to prepare the rubber substrate. In particular embodiments the rubber substrate may optionally include up to about 25 wt. % of structural units derived from one or more monomers selected from (meth) acrylate monomers, alkenyl aromatic monomers and monoethylenically unsaturated nitrile monomers. Suitable copolymerizable (meth)acrylate monomers include, but are not limited to, $C_1$-$C_{12}$ aryl or haloaryl substituted acrylate, $C_1$-$C_{12}$ aryl or haloaryl substituted methacrylate, or mixtures thereof; monoethylenically unsaturated carboxylic acids, such as, for example, acrylic acid, methacrylic acid and itaconic acid; glycidyl (meth)acrylate, hydroxy alkyl (meth)acrylate, hydroxy($C_1$-$C_{12}$)alkyl (meth)acrylate, such as, for example, hydroxyethyl methacrylate; ($C_4$-$C_{12}$)cycloalkyl (meth)acrylate monomers, such as, for example, cyclohexyl methacrylate; (meth)acrylamide monomers, such as, for example, acrylamide, methacrylamide and N-substituted-acrylamide or N-substituted-methacrylamides; maleimide monomers, such as, for example, maleimide, N-alkyl maleimides, N-aryl maleimides, N-phenyl maleimide, and haloaryl substituted maleimides; maleic anhydride; methyl vinyl ether, ethyl vinyl ether, and vinyl esters, such as, for example, vinyl acetate and vinyl propionate. Suitable alkenyl aromatic monomers include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, 4-isopropylstyrene, vinyl toluene, alpha-methyl vinyl toluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile. Substituted styrenes with mixtures of substituents on the aromatic ring are also suitable. As used herein, the term "monoethylenically unsaturated nitrile monomer" means an acyclic compound that includes a single nitrile group and a single site of ethylenic unsaturation per molecule and includes, but is not limited to, acrylonitrile, methacrylonitrile, alpha-chloro acrylonitrile, and the like.

In a particular embodiment the rubber substrate comprises repeating units derived from one or more ($C_1$-$C_{12}$)alkyl acrylate monomers. In still another particular embodiment, the rubber substrate comprises from 40 to 95 wt. % repeating units derived from one or more ($C_1$-$C_{12}$)alkyl acrylate monomers, and more particularly from one or more monomers selected from ethyl acrylate, butyl acrylate and n-hexyl acrylate.

The rubber substrate may be present in the rubber modified thermoplastic resin in one embodiment at a level of from about 4 wt. % to about 94 wt. %; in another embodiment at a level of from about 10 wt. % to about 80 wt. %; in another embodiment at a level of from about 15 wt. % to about 80 wt. %; in another embodiment at a level of from about 35 wt. % to about 80 wt. %; in another embodiment at a level of from about 40 wt. % to about 80 wt. %; in another embodiment at a level of from about 25 wt. % to about 60 wt. %, and in still another embodiment at a level of from about 40 wt. % to about 50 wt. %, based on the weight of the rubber modified thermoplastic resin. In other embodiments the rubber substrate may be present in the rubber modified thermoplastic resin at a level of from about 5 wt. % to about 50 wt. %; at a level of from about 8 wt. % to about 40 wt. %; or at a level of from about 10 wt. % to about 30 wt. %, based on the weight of the particular rubber modified thermoplastic resin.

There is no particular limitation on the particle size distribution of the rubber substrate (sometimes referred to hereinafter as initial rubber substrate to distinguish it from the rubber substrate following grafting). In some embodiments the initial rubber substrate may possess a broad, essentially monomodal, particle size distribution with particles ranging in size from about 50 nanometers (nm) to about 1000 nm. In other embodiments the mean particle size of the initial rubber substrate may be less than about 100 nm. In still other embodiments the mean particle size of the initial rubber substrate may be in a range of between about 80 nm and about 400 nm. In other embodiments the mean particle size of the initial rubber substrate may be greater than about 400 nm. In still other embodiments the mean particle size of the initial rubber substrate may be in a range of between about 400 nm and about 750 nm. In still other embodiments the initial rubber substrate comprises particles which are a mixture of particle sizes with at least two mean particle size distributions. In a particular embodiment the initial rubber substrate comprises a mixture of particle sizes with each mean particle size distribution in a range of between about 80 nm and about 750 nm. In another particular embodiment the initial rubber substrate comprises a mixture of particle sizes, one with a mean particle size distribution in a range of between about 80 nm and about 400 nm; and one with a broad and essentially monomodal mean particle size distribution.

The rubber substrate may be made according to known methods, such as, but not limited to, a bulk, solution, or emulsion process. In one non-limiting embodiment the rubber substrate is made by aqueous emulsion polymerization in the presence of a free radical initiator, e.g., an azonitrile initiator, an organic peroxide initiator, a persulfate initiator or a redox initiator system, and, optionally, in the presence of a chain transfer agent, e.g., an alkyl mercaptan, to form particles of rubber substrate.

The rigid thermoplastic resin phase of the rubber modified thermoplastic resin comprises one or more thermoplastic polymers. In one embodiment of the present invention monomers are polymerized in the presence of the rubber substrate to thereby form a rigid thermoplastic phase, at least a portion of which is chemically grafted to the elastomeric phase. The portion of the rigid thermoplastic phase chemically grafted to rubber substrate is sometimes referred to hereinafter as grafted copolymer. The rigid thermoplastic phase comprises a thermoplastic polymer or copolymer that exhibits a glass transition temperature (Tg) in one embodiment of greater than about 25° C., in another embodiment of greater than or equal to 90° C., and in still another embodiment of greater than or equal to 100° C.

In a particular embodiment the rigid thermoplastic phase comprises a polymer having structural units derived from one or more monomers selected from the group consisting of ($C_1$-$C_{12}$)alkyl-(meth)acrylate monomers, aryl-(meth)acrylate monomers, alkenyl aromatic monomers and monoethylenically unsaturated nitrile monomers. Suitable ($C_1$-$C_{12}$) alkyl-(meth)acrylate and aryl-(meth)acrylate monomers, alkenyl aromatic monomers and monoethylenically unsaturated nitrile monomers include those set forth hereinabove in the description of the rubber substrate. In addition, the rigid thermoplastic resin phase may, provided that the Tg limitation for the phase is satisfied, optionally include up to about 10 wt. % of third repeating units derived from one or more other copolymerizable monomers.

The rigid thermoplastic phase typically comprises one or more alkenyl aromatic polymers. Suitable alkenyl aromatic polymers comprise at least about 20 wt. % structural units derived from one or more alkenyl aromatic monomers. In a particular embodiment suitable alkenyl aromatic polymers comprise structural units derived from one or more alkenyl aromatic monomers and present in a range of between about 20 wt. % and about 50 wt. %, based on the total weight of monomers added to form the copolymer comprising the grafted copolymer and the rigid thermoplastic phase. In one embodiment the rigid thermoplastic phase comprises an alkenyl aromatic polymer having structural units derived from one or more alkenyl aromatic monomers and from at least one other polymerizable monomer. Examples of such alkenyl aromatic polymers include, but are not limited to, styrene/acrylonitrile copolymers, alpha-methylstyrene/acrylonitrile copolymers, alpha-methylstyrene/styrene/acrylonitrile copolymers, styrene/N-aryl maleimide copolymers, and styrene/N-phenyl maleimide copolymers. In another particular embodiment the rigid thermoplastic phase comprises an alkenyl aromatic polymer having structural units derived from one or more alkenyl aromatic monomers; from one or more monoethylenically unsaturated nitrile monomers; and from one or more monomers selected from the group consisting of $(C_1-C_{12})$alkyl- and aryl-(meth)acrylate monomers. Examples of such alkenyl aromatic polymers include, but are not limited to, styrene/acrylonitrile/methyl methacrylate copolymers, alpha-methylstyrene/acrylonitrile/methyl methacrylate copolymers and alpha-methylstyrene/styrene/acrylonitrile/methyl methacrylate copolymers. Further examples of suitable alkenyl aromatic polymers comprise styrene/methyl methacrylate copolymers, styrene/maleic anhydride copolymers; styrene/acrylonitrile/maleic anhydride copolymers, and styrene/acrylonitrile/acrylic acid copolymers. These copolymers may be used for the rigid thermoplastic phase either individually or as mixtures.

When structural units in copolymers are derived from one or more monoethylenically unsaturated nitrile monomers, then the amount of nitrile monomer added to form the copolymer comprising the grafted copolymer and the rigid thermoplastic phase may be in one embodiment in a range of between about 5 wt. % and about 40 wt. %, in another embodiment in a range of between about 5 wt. % and about 30 wt. %, in another embodiment in a range of between about 10 wt. % and about 30 wt. %, and in yet another embodiment in a range of between about 15 wt. % and about 30 wt. %, based on the total weight of monomers added to form the copolymer comprising the grafted copolymer and the rigid thermoplastic phase. In a particular embodiment the amount of nitrile monomer added to form the copolymer comprising the grafted copolymer and the rigid thermoplastic phase may be in a range of between about 10 wt. % and about 20 wt. %, based on the total weight of monomers added to form the copolymer comprising the grafted copolymer and the rigid thermoplastic phase.

When structural units in copolymers are derived from one or more $(C_1-C_{12})$alkyl- and/or aryl-(meth)acrylate monomers, then the amount of the said monomer(s) added to form the copolymer comprising the grafted copolymer and the rigid thermoplastic phase may be in one embodiment in a range of between about 5 wt. % and about 50 wt. %, in another embodiment in a range of between about 5 wt. % and about 45 wt. %, in another embodiment in a range of between about 10 wt. % and about 35 wt. %, and in yet another embodiment in a range of between about 15 wt. % and about 35 wt. %, based on the total weight of monomers added to form the copolymer comprising the grafted copolymer and the rigid thermoplastic phase. In a particular embodiment when structural units in copolymers are derived from one or more $(C_1-C_{12})$alkyl- and/or aryl-(meth)acrylate monomers, then the amount of the said monomer(s) added to form the copolymer comprising the grafted copolymer and the rigid thermoplastic phase may be in a range of between about 20 wt. % and about 50 wt. %, based on the total weight of monomers added to form the copolymer comprising the grafted copolymer and the rigid thermoplastic phase.

When structural units in polymers in the rigid thermoplastic phase are derived from monomers comprising at least one $(C_1-C_{12})$alkyl- and aryl-(meth)acrylate monomer, then the wt./wt. ratio of said (meth)acrylate monomer to the totality of other monomers from which said rigid thermoplastic phase is derived is in one embodiment in a range of between about 10:1 and about 1:10; in another embodiment in a range of between about 8:1 and about 1:8; in another embodiment in a range of between about 5:1 and about 1:5; in another embodiment in a range of between about 3:1 and about 1:3; in another embodiment in a range of between about 2:1 and about 1:2; and in yet another embodiment in a range of between about 1.5:1 and about 1:1.5. In particular embodiments when at least one $(C_1-C_{12})$alkyl- or aryl-(meth)acrylate monomer, at least one vinyl aromatic monomer, and optionally at least one monoethylenically unsaturated nitrile monomer are employed as monomers in the rigid thermoplastic phase, the wt./wt. ratio of said monomers is, respectively, in one embodiment in a range of from about 80/20/0 to about 20/60/20, in another embodiment in a range of from about 60/30/10 to about 45/30/25, and in still another embodiment in a range of from about 45/40/15 to about 35/40/25.

The amount of grafting that takes place between the rubber substrate and monomers comprising the rigid thermoplastic phase varies with the relative amount and composition of the elastomeric phase. In one embodiment, greater than about 10 wt. % of the rigid thermoplastic phase is chemically grafted to the rubber substrate, based on the total amount of rigid thermoplastic phase in the composition. In another embodiment, greater than about 15 wt. % of the rigid thermoplastic phase is chemically grafted to the rubber substrate, based on the total amount of rigid thermoplastic phase in the composition. In still another embodiment, greater than about 20 wt. % of the rigid thermoplastic phase is chemically grafted to the rubber substrate, based on the total amount of rigid thermoplastic phase in the composition. In particular embodiments the amount of rigid thermoplastic phase chemically grafted to the rubber substrate may be in a range of between about 5 wt. % and about 90 wt. %; between about 10 wt. % and about 90 wt. %; between about 15 wt. % and about 85 wt. %; between about 15 wt. % and about 50 wt. %; or between about 20 wt. % and about 50 wt. %, based on the total amount of rigid thermoplastic phase in the composition. In yet other embodiments, about 40 wt. % to 90 wt. % of the rigid thermoplastic phase is free, that is, non-grafted.

The rigid thermoplastic phase may be present in the rubber modified thermoplastic resin in one embodiment at a level of from about 85 wt. % to about 6 wt. %; in another embodiment at a level of from about 65 wt. % to about 6 wt. %; in another embodiment at a level of from about 60 wt. % to about 20 wt. %; in another embodiment at a level of from about 75 wt. % to about 40 wt. %, and in still another embodiment at a level of from about 60 wt. % to about 50 wt. %, based on the weight of the rubber modified thermoplastic resin. In other embodiments the rigid thermoplastic phase may be present in a range of between about 90 wt. % and about 30 wt. %, based on the weight of the rubber modified thermoplastic resin.

The rigid thermoplastic phase may be formed solely by polymerization carried out in the presence of rubber substrate, or by combination with one or more separately synthesized rigid thermoplastic polymers to the rubber modified thermoplastic resin comprising the composition. In some embodiments the separately synthesized rigid thermoplastic polymer comprises structural units essentially identical to those of the rigid thermoplastic phase comprising the rubber modified thermoplastic resin. In some particular embodiments the separately synthesized rigid thermoplastic polymer is a copolymer comprising structural units derived from styrene and acrylonitrile (SAN); alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate. When at least a portion of separately synthesized rigid thermoplastic polymer is combined with the rubber modified thermoplastic resin, then the amount of said separately synthesized rigid thermoplastic polymer added is in one embodiment in a range of between about 5 wt. % and about 90 wt. %, in another embodiment in a range of between about 5 wt. % and about 80 wt. %, in another embodiment in a range of between about 10 wt. % and about 70 wt. %, in another embodiment in a range of between about 15 wt. % and about 65 wt. %, and in still another embodiment in a range of between about 20 wt. % and about 65 wt. %, based on the weight of resinous components in the composition.

Two or more different rubber substrates, each possessing a different mean particle size, may be separately employed in a polymerization reaction to prepare rigid thermoplastic phase, and then the products blended together to make the rubber modified thermoplastic resin. In illustrative embodiments wherein such products each possessing a different mean particle size of initial rubber substrate are blended together, then the ratios of said substrates may be in a range of about 90:10 to about 10:90, or in a range of about 80:20 to about 20:80, or in a range of about 70:30 to about 30:70. In some embodiments an initial rubber substrate with smaller particle size is the major component in such a blend containing more than one particle size of initial rubber substrate.

The rigid thermoplastic phase may be made according to known processes, for example, mass polymerization, emulsion polymerization, suspension polymerization or combinations thereof, wherein at least a portion of the rigid thermoplastic phase is chemically bonded, i.e., "grafted" to the elastomeric phase via reaction with unsaturated sites present in the elastomeric phase. The grafting reaction may be performed in a batch, continuous or semi-continuous process. Representative procedures include, but are not limited to, those taught in U.S. Pat. No. 3,944,631; and in U.S. patent application Ser. No. 08/962,458, filed Oct. 31, 1997. The unsaturated sites in the elastomeric phase are provided, for example, by residual unsaturated sites in those structural units of the rubber substrate that were derived from a graftlinking monomer. In some embodiments of the present invention monomer grafting to rubber substrate with concomitant formation of rigid thermoplastic phase may optionally be performed in stages wherein at least one first monomer is grafted to rubber substrate followed by at least one second monomer different from said first monomer. Representative procedures for staged monomer grafting to rubber substrate include, but are not limited to, those taught in commonly assigned U.S. patent application Ser. No. 10/748,394, filed Dec. 30, 2003.

In a particular embodiment the rubber modified thermoplastic resin is an ASA graft copolymer such as that manufactured and sold by General Electric Company under the trademark GELOY®, or an acrylate-modified acrylonitrile-styrene-acrylate graft copolymer. ASA polymeric materials include, for example, those disclosed in U.S. Pat. No. 3,711,575. Acrylonitrile-styrene-acrylate graft copolymers comprise those described for example in commonly assigned U.S. Pat. Nos. 4,731,414 and 4,831,079. In some embodiments of the invention where an acrylate-modified ASA is used, the ASA component further comprises an additional acrylate-graft formed from monomers selected from the group consisting of $C_1$ to $C_{12}$ alkyl- and aryl-(meth)acrylate as part of either the rigid phase, the elastomeric phase, or both. Such copolymers are referred to as acrylate-modified acrylonitrile-styrene-acrylate graft copolymers, or acrylate-modified ASA. A particular monomer is methyl methacrylate to result in a PMMA-modified ASA (sometimes referred to hereinafter as "MMA-ASA").

In another embodiment resinous compositions of the present invention comprise at least one polymer comprising carbonate structural units. In particular embodiments polymers comprising carbonate structural units are selected from the group consisting of copolymers comprising carbonate structural units and blends comprising a polycarbonate and at least one other resin different from polycarbonate. Copolymers comprising carbonate structural units may further comprise siloxane or ester structural units. Illustrative examples of such copolymers comprise polyestercarbonates such as those comprising carbonate structural units derived from bisphenol A and ester structural units derived from a mixture of isophthalic acid, terephthalic acid, and resorcinol as described for example in U.S. Pat. No. 6,559,270, and polydialkyl siloxane-polycarbonate copolymers such as those comprising carbonate structural units derived from bisphenol A and also comprising dimethyl siloxane structural units. Illustrative examples of copolymers comprising carbonate structural units comprise LEXAN® SLX polyestercarbonate and LEXAN® EXL polydimethyl siloxane-polycarbonate copolymer available from General Electric Plastics. Illustrative examples of blends comprise blends of a polycarbonate with a polyester or with a rubber modified thermoplastic resin. Some particular examples of blends comprise a bisphenol-A polycarbonate combined with poly(butylene terephthalate), poly(ethylene terephthalate), poly(cyclohexanedimethanol-ethylene glycol terephthalate), poly(cyclohexylenedimethylene-cyclohexanedicarboxylate), or a polyester with structural units derived from a mixture of isophthalic acid, terephthalic acid, and resorcinol, or blends of a bisphenol-A polycarbonate combined with acrylonitrile-butadiene-styrene copolymer (ABS) or with ASA, particularly MMA-ASA. Combinations of two or more polycarbonates with different molecular weights and/or with different end-groups may be employed to provide benefits in blend properties. Illustrative examples of blends comprise XENOY® polycarbonate-polyester blend, XYLEX® polycarbonate-polyester blend, and CYCOLOY® polycarbonate-ABS blend available from General Electric Plastics. In some particular embodiments resins comprising at least one polymer comprising carbonate structural units suitable for use in compositions of the present invention are those which exhibit weatherability, such as, but not limited to, UV resistance.

Compositions of the invention comprise at least one inorganic infrared reflecting pigment. The pigment is not particularly limited provided that it hardly absorbs infrared radiation. Illustrative inorganic infrared reflecting pigments comprise: metal oxides, mixed metal oxides, titanates, aluminates, metal carbonates, iron oxides, chromium oxides, ultramarines, stainless steel powder, mica powder covered with titanium oxide or metal sulfides (including rare-earth sulfides). In particular embodiments inorganic infrared reflecting pigments comprise chromium iron oxides or black spinels, such as but not limited to, chrome iron nickel black spinel. Illustrative examples of these materials are available under the names "Black 1", "Black 462", "Black 376", and "Black 411" from The Shepherd Color Company, Cincinnati, Ohio.

Compositions of the invention comprise at least one organic colorant. In some embodiments organic colorants are non-absorbing in the infrared. Illustrative organic colorants comprise those which contribute to the production of a dark or a black color in molded parts of the compositions. Suitable organic colorants may be employed either alone or as mixtures comprising more than one organic colorant in embodiments of compositions of the invention. In some particular embodiments at least two organic colorants may be employed to produce either a dark or a black color. Illustrative organic colorants are derived from the class of anthraquinone, azo, phthalic anhydride, phthalocyanine, indigo/thioindigo, azomethine, azomethine-azo, dioxazine, quinacridone, isoindolinone, isoindoline, diketopyrrolopyrrole, perylene, or perinone organic colorants, or mixtures thereof. Other illustrative examples of particular examples of organic colorants that produce a dark or a black color include but are not limited to mixtures of Solvent Green 3 and Solvent Red 135 or Solvent Green 3, Solvent Violet 13, and Pigment Blue 15:4 as referenced in the Color Index. Additionally, when a dark color is to be produced, azomethine system organic pigments such as CHROMOFINE® Black A-1103, a trademarked product produced by Dainichiseika Color & Chemicals Mfg. Co., Ltd., and perylene system pigments such as PALIOGEN® Black S 0084 (C.I. Pigment Black 31), a trademarked product produced by BASF Corporation, may be employed, and these may be dispersed in the resin component either singly or in combination with other pigments. In other embodiments particular examples of organic colorants comprise MACROLEX® Green 5B Gran, which is an anthraquinone dyestuff, MACROLEX® Red EG Gran, which is a perinone dyestuff, and MACROLEX® Red Violet R Gran also known as Disperse Violet 31/26, C.A.S. # 6408-72-6,1,4-diamino-2, 3-diphenoxyanthraquinone, obtained from Lanxess Corporation. Other illustrative examples of suitable organic colorants may be found in U.S. Pat. No. 6,521,038.

The amounts of inorganic infrared reflecting (IRR) pigment and organic colorant in embodiments of compositions of the invention are those amounts effective to provide a colorant combination comprising at least one inorganic infrared reflecting pigment and at least one organic colorant resulting in a molded part with a heating build-up (HBU) of less than or equal to about 34° C. and an L* value of less than about 30 with specular component included or less than about 20 with specular component excluded. In one particular embodiment the L* value is less than about 10 with specular component excluded. In various embodiments the total amount of IRR pigment present in compositions is greater than or equal to about 0.02 parts per hundred parts resinous components (phr). In other embodiments the total amount of IRR pigment present is less than or equal to about 5 phr, particularly less than or equal to about 4 phr. In still another embodiment the total amount of IRR pigment present is in a range of 0.04-4.0 phr. When more than one organic colorant is present in embodiments of the compositions, then the total amount of organic colorant is greater than or equal to about 0.002 phr. In other embodiments the total amount of organic colorant present is less than or equal to about 4 phr, particularly less than or equal to about 3 phr. In still another embodiment the total amount of organic colorant present is in a range of 0.002-2.5 phr, particularly in a range of 0.05-2.0 phr, and more particularly in a range of 0.1-2.0 phr. In a particular embodiment the total amount of IRR pigment present is greater than or equal to about 0.4 phr and the total amount of organic colorant present is greater than or equal to about 0.2 phr. In another particular embodiment the total amount of IRR pigment present is greater than or equal to about 0.02 phr and the total amount of organic colorant is greater than or equal to about 0.002 phr. In another particular embodiment the total amount of IRR pigment present is greater than or equal to about 0.75 phr and the total amount of organic colorant is greater than or equal to about 0.5 phr. In another particular embodiment the total amount of IRR pigment present is greater than or equal to about 1 phr and the total amount of organic colorant is greater than or equal to about 0.8 phr. In still other particular embodiments the total amount of IRR pigment present is greater than or equal to about 2 phr and the total amount of organic colorant is greater than or equal to about 1 phr.

Thermoplastic resin compositions in embodiments of the present invention may optionally comprise various conventional additives, such as, but not limited to: (1) antioxidants, such as, for example, organophosphites, for example, tris (nonyl-phenyl)phosphite, (2,4,6-tri-tert-butylphenyl)(2-butyl-2-ethyl-1,3-propanediol)phosphite, bis(2,4-di-t-butylphenyl)pentaerythritol diphosphite or distearyl pentaerythritol diphosphite, as well as alkylated monophenols, polyphenols, alkylated reaction products of polyphenols with dienes, such as, for example, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphenyl) propionic acid with mono- or polyhydric alcohols, esters of thioalkyl or thioaryl compounds, such as, for example, distearylthiopropionate, dilaurylthiopropionate, ditridecylthiodipropionate, or amides of beta-(3,5-di-tert-butyl-4-hydroxyphenol)-propionic acid; (2) UV absorbers and light stabilizers such as, for example, HALS, 2-(2'-hydroxyphenyl)-benzotriazoles, 2-hydroxybenzophenones, esters of substituted or unsubstituted benzoic acids, acrylates, or nickel compounds; (3) metal deactivators, such as, for example, N,N'-diphenyloxalic acid diamide, or 3-salicyloylamino-1,2,4-triazole; (4) peroxide scavengers, such as, for example, ($C_{10}$-$C_{20}$)alkyl esters of beta-thiodipropionic acid, or mercapto benzimidazole; (5) basic co-stabilizers, such as, for example, melamine, polyvinylpyrrolidone, triallyl cyanurate, urea derivatives, hydrazine derivatives, amines, polyamides, or polyurethanes; (6) sterically hindered amines such as, for example, triisopropanol amine or the reaction product of 2,4-dichloro-6-(4-morpholinyl)-1,3,5-triazine with a polymer of 1,6-diamine, or N,N'-bis(2,2,4,6-tetramethyl-4-piperidenyl) hexane; (7) neutralizers such as magnesium stearate, magnesium oxide, zinc oxide, zinc stearate, calcium stearate, or hydrotalcite; (8) other additives such as, for example, lubricants such as, for example, pentaerythritol tetrastearate, EBS wax, or silicone fluids, plasticizers, optical brighteners, pigments, dyes, colorants, flameproofing agents, anti-static agents, or blowing agents; (9) flame retardant additives such as, for example, halogen-containing organic flame retardant compounds, organophosphate flame retardant compounds, or borate flame retardant compounds; or (10) fillers, illustrative examples of which comprise reinforcing fillers, extending fillers, glass fibers, glass spheres, carbon fibers, metal fibers, metal flakes, aluminum flakes, silica, silicates, zeolites, titanium dioxide, stone powder, talc, lithopone, calcium carbonate, diatomaceous earth, crushed quartz, clay, calcined clay, kaolin, asbestos, cellulose, wood flour, cork, cotton and synthetic textile fibers, or mixtures thereof. In particular embodiments compositions of the invention further comprise an additive selected from the group consisting of lubricants, neutralizers, stabilizers, heat stabilizers, light stabilizers, antioxidants, UV screeners, UV absorbers, and mixtures thereof.

In one embodiment the compositions of the present invention may be prepared by mixing the components as described herein to form a first mixture. The mixing can be typically carried out in any conventional mixer like drum mixers, ribbon mixers, vertical spiral mixers, Muller mixers, Henschel mixers, sigma mixers, chaotic mixers, static mixers or the like. The first mixture is then compounded under melt-mixing conditions using any conventional method, such as extrusion kneading or roll kneading, a two-roll mill, in a Banbury mixer or in a single screw or twin-screw extruder, or in any high shear mixing device to mix the components to produce an intimate mixture, and optionally, to reduce the composition so formed to particulate form, for example, by pelletizing or grinding the composition. The twin screw extruder, when employed, can be co-rotating, counter rotating, intermeshing, non-intermeshing, a planetary gear extruder, a co-continuous mixer, or the like. The compounding process can be a continuous, semi-continuous, or a batch process. In other embodiments all or a portion of resin or additive, colorant or pigment, either neat or in the form of a mixture, may be combined with the composition at some stage of a blending process, such as in an extrusion process. Those of ordinary skill in the art will be able to adjust blending times, as well as component addition location and sequence, without undue additional experimentation. Also, optionally, a portion of the rigid thermoplastic resin may be mixed with any additive, colorant and/or pigment to prepare a master batch, and then the remaining rigid thermoplastic resin may be added and mixed therewith later for multistage mixture.

Compositions in embodiments of the present invention can be molded into useful articles by a variety of means such as injection, extrusion, coextrusion, rotary molding, blow molding or thermoforming, or like methods to form articles. hi some embodiments the articles comprise unitary articles. Illustrative unitary articles comprise a profile consisting essentially of a composition of the present invention. In still other embodiments the articles may comprise multilayer articles comprising at least one layer comprising a composition of the present invention. In various embodiments multilayer articles may comprise a cap-layer comprising a composition of the invention and a substrate layer comprising at least one thermoplastic resin different from said cap-layer. Illustrative examples of articles include, but are not limited to, Some particular suitable articles comprise outdoor and indoor signs, and highway signs, articles for outdoor vehicle and device (OVAD) applications; exterior and interior components for automotive, truck, military and emergency vehicles (including automotive and water-borne vehicles), scooter, bicycle, and motorcycle, including panels, quarter panels, vertical panels, horizontal panels, trim, pillars, center posts, doors, door frames, decklids, trunklids, hoods, bonnets, roofs, fascia, pillar appliques, cladding, body side moldings, wheel covers, window frames, and license plate enclosures; enclosures, housings, panels, and parts for outdoor vehicles and devices; enclosures for electrical and telecommunication devices; electrical components; outdoor furniture; aircraft components; boats and marine equipment, including trim, enclosures, and housings; outboard motor housings; depth finder housings, pools; spas; hot-tubs; steps; step coverings; building and construction applications such as fencing, roofs, siding, particularly vinyl siding applications; windows, decorative window furnishings or treatments; wall panels, and doors; enclosures, housings, panels, and parts for automatic teller machines (ATM); enclosures, housings, panels, and parts for lawn and garden tractors, lawn mowers, and tools, including lawn and garden tools; window and door trim; toys; enclosures, housings, panels, and parts for recreational vehicle panels and components; playground equipment; articles made from plastic-wood combinations; golf course markers; utility pit covers; mobile phone housings; radio sender housings; radio receiver housings; light fixtures; lighting appliances; reflectors; network interface device housings; transformer housings; air conditioner housings; cladding or seating for public transportation; cladding or seating for trains, subways, or buses; meter housings; antenna housings; cladding for satellite dishes; computer and business machine housings, home appliances and media storage devices, such as, for example, audiovisual cassettes and disk drive components; decking, desktops, pricing channels, corner guards, gutters, handrails, down-spouts, fence posts, and the like.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples certain abbreviations have the following meanings: "IRR" means infrared reflecting and "C.Ex." means comparative example. Components used in the compositions were as follows: The ASA resin employed comprised structural units derived from 37.5 wt. % styrene, 18 wt. % acrylonitrile, and 44.5 wt. % butyl acrylate. The MMA-ASA resin employed comprised structural units derived from 30.1 wt. % styrene, 13.7 wt. % acrylonitrile, 11.1 wt. % methyl methacrylate, and 45 wt. % butyl acrylate. Various SAN resin grades were employed and gave similar results; the SAN grades comprised structural units derived from styrene in a range of about 72%-75% and acrylonitrile in a range of about 28%-25%. The MMASAN resin employed comprised structural units derived from about 40% styrene, about 25% acrylonitrile, and about 35% methyl methacrylate. The pigments and colorants were as follows:

"Conventional Black" was C.I. Pigment Black 7.

IRR Black 1 was "Black 376", a jet-black powder comprising chrome iron nickel black spinel produced by high temperature calcination and obtained from The Shepherd Color Company, Cincinnati, Ohio.

IRR Black 2 was "Black 411", a brown-black powder comprising chromium iron oxide produced by high temperature calcination and obtained from The Shepherd Color Company, Cincinnati, Ohio.

Organic Colorant 1 was MACROLEX® Green 5B Gran, an anthraquinone dyestuff obtained from Lanxess Corporation.

Organic Colorant 2 was MACROLEX® Red EG Gran, a perinone dyestuff obtained from Lanxess Corporation.

Organic Colorant 3 was Disperse Violet 31/26, C.A.S. # 6408-72-6,1,4-diamino-2,3-diphenoxyanthraquinone, MACROLEX® Red Violet R Gran obtained from Lanxess Corporation.

Compositions comprising 55% ASA, 45% MMASAN, and additives as indicated in Table 1 were mixed in a Henschel mixer, and then extruded using standard compounding conditions (for example, melt temperature in a range of about 240° C. to about 260° C.) and pelletized. Pellets of the compositions were injection molded into color plaques of dimensions 62.4 mm×62.4 mm, and 3.2 mm thick. The heating build-up (HBU) due to the absorption of solar energy in materials for outdoor application was measured based upon data obtained by experimentally determining the total solar reflectance (TSR) and the temperature rise above ambient temperature under an ultraviolet heat lamp, relative to carbon black according to ASTM D4803-89. TSR measurement was conducted with a Solar Spectrum Reflectometer, model SSR-ER version 5.0, equipped with a single tungsten filament source. Weathering performance was characterized by color change (ΔE) during exposure in an Atlas Xenon arc accelerated weathering chamber according to ASTM G26. Color measurements were done using a Gretag-Macbeth 7000A spectrophotometer with integrating sphere and with specular component included using CIE LAB D65 illuminant and 10 degree field of view. The term "specular component" corresponds to specular reflection as defined in ASTM E284. Additionally, color measurements were done using a Gretag-Macbeth CE-740 gonio spectrophotometer with a specular angle of 45 degrees using CIE LAB D65 illuminant, this latter mode being preferred since it enabled discrimination between high gloss, jet black samples.

EXAMPLES 1-2 AND COMPARATIVE EXAMPLES 1-6

Different combinations of black pigment and organic/inorganic colorants were evaluated for desired color space and infrared reflection in ASA compositions. The compositions are shown in Table 1. The amounts shown are phr values by weight with the remaining material comprising ASA and MMASAN. The results of property measurements are presented in Table 2.

TABLE 1

| Ex. or C. Ex. | Conv. Black | IRR Black 1 | IRR Black 2 | Org. Color. 1 | Org. Color. 2 | Org. Color. 3 |
|---|---|---|---|---|---|---|
| Ex. 1 | — | 3 | — | 0.8 | 0.8 | 0.05 |
| Ex. 2 | — | — | 3 | 0.8 | 0.8 | — |
| C. Ex. 1 | — | 3 | — | — | — | — |
| C. Ex. 2 | — | — | 3 | — | — | — |
| C. Ex. 3 | 3 | — | — | 0.8 | 0.8 | — |
| C. Ex. 4 | 1 | — | — | 0.8 | 0.8 | — |
| C. Ex. 5 | 3 | — | — | — | — | — |
| C. Ex. 6 | 1 | — | 3 | 0.8 | 0.8 | — |

TABLE 2

| Ex. or C. Ex. | HBU, °C. | TSR, % | ΔE | Gretag-Macbeth 7000A | | | Gretag-Macbeth CE-740 | | |
|---|---|---|---|---|---|---|---|---|---|
| | | | | L* | a* | b* | L* | A* | B* |
| Ex. 1 | 33.3 | 14.4 | <2 | 28.1 | −0.7 | −2.8 | 14.4 | −2.0 | −6.3 |
| Ex. 2 | 27.4 | 31.0 | <2 | 29.1 | −0.1 | −2.0 | 16.4 | −0.7 | −4.0 |
| C. Ex. 1 | 34.5 | 15.2 | <2 | 32.4 | 0.4 | −3.0 | 23.8 | 0.5 | −5.5 |
| C. Ex. 2 | 26.5 | 32.2 | <2 | 33.8 | 3.8 | −0.3 | 25.3 | 5.5 | −1.1 |
| C. Ex. 3 | 38.1 | 4.8 | — | 27.0 | −0.3 | −0.8 | 8.5 | −1.1 | −2.5 |
| C. Ex. 4 | 38.5 | 4.9 | — | 27.4 | −0.5 | −1.5 | 10.3 | −1.6 | −4.0 |
| C. Ex. 5 | 38.9 | 4.9 | — | 27.1 | −0.1 | −0.7 | 8.4 | −0.5 | −2.1 |
| C. Ex. 6 | 38.8 | 5.5 | — | 27.6 | −0.2 | −1.2 | 10.5 | −0.6 | −2.4 |

The results in Table 2 demonstrate that Examples 1 and 2 comprising at least one inorganic infrared reflecting pigment and at least one organic colorant have a very good combination of low HBU, low value for L*, and low value for ΔE. Comparative examples 1 and 2 containing at least one inorganic infrared reflecting pigment but no organic colorant both show higher value for L* than Examples 1 and 2. The comparative examples 3, 4, 5, and 6 containing conventional carbon black colorant all show higher values for HBU than Examples 1 and 2. In particular embodiments compositions of the invention have a ΔE of less than about 2 after 1250 kilojoules per square meter (kJ/m²). Similar trends in HBU values and L* values were seen when MMA-ASA was used in place of ASA or when SAN was employed in place of MMASAN.

The compositions of the invention show a surprising advantage in both low HBU, low value for L*, and good weatherability as shown by low value for delta E. These advantages are particularly beneficial for compositions to make dark molded parts, such as dark brown, dark green, black, dark blue, dark gray, dark red, and the like.

EXAMPLES 3-8 AND COMPARATIVE EXAMPLES 7-18

Different combinations of black pigment and organic/inorganic colorants were evaluated for desired color space and infrared reflection in compositions comprising different resins. The resins employed were as follows:

"Resin-1": a blend comprising a bisphenol-A polycarbonate and a polyester comprising structural units derived from terephthalic acid, cyclohexanedimethanol, and ethylene glycol.

"Resin-2": a blend comprising a bisphenol-A polycarbonate, a poly(butylene terephthalate), and an impact modifier.

"Resin-3": a blend comprising about 90% of a polyestercarbonate comprising carbonate structural units derived from bisphenol A and ester structural units derived from isophthalic acid, terephthalic acid, and resorcinol, and about 10% of a bisphenol-A polycarbonate.

"Resin-4": a blend comprising about 50% of a polyestercarbonate comprising carbonate structural units derived from bisphenol A and ester structural units derived from isophthalic acid, terephthalic acid, and resorcinol, and about 50% of a bisphenol-A polycarboate.

"Resin-5": a bisphenol-A polycar bonate/poly(dimethyl siloxane) copolymer.

"Resin-6: a blend comprising a isphenol-A polycarbonate and a copolymer comprising structural units derived from acrylonitrile, butadiene, and styrene (ABS).

For comparative purposes values of HBU and TSR were determined for molded parts of each resin in its natural state without added pigment/colorant ("natural resin"). Table 3 shows these values. The data show that TSR values for different natural resins varied significantly, while HBU values for all evaluated resins were relatively close.

TABLE 3

| Resin no. | HBU, °C. | TSR, % |
|---|---|---|
| 1 | 31.4 | 8.9 |
| 2 | 31.4 | 60.1 |
| 3 | 30.2 | 9.2 |
| 4 | 31.7 | 9.2 |
| 5 | 30.4 | 9.1 |
| 6 | 29.9 | 47.5 |

The pigment/colorant-containing compositions and their corresponding property measurements are shown in Table 4. In Table 4 color measurements were done using a Gretag-Macbeth 7000A spectrophotometer with integrating sphere and with specular component excluded using CIE LAB D65 illuminant and 10 degree field of view. The amounts shown are phr values by weight with the remaining material comprising resin.

TABLE 4

| | C. Ex. 7 | C. Ex. 8 | Ex. 3 | C. Ex. 9 | C. Ex. 10 | Ex. 4 | C. Ex. 11 | C. Ex. 12 | Ex. 5 | C. Ex. 13 | C. Ex. 14 | Ex. 6 | C. Ex. 15 | C. Ex. 16 | Ex. 7 | C. Ex. 17 | C. Ex. 18 | Ex. 8 |
|---|---|---|---|---|---|---|---|---|---|---|---|---|---|---|---|---|---|---|
| Resin | 1 | 1 | 1 | 2 | 2 | 2 | 3 | 3 | 3 | 4 | 4 | 4 | 5 | 5 | 5 | 6 | 6 | 6 |
| Conv. Black | 0.5 | — | — | 0.5 | — | — | 0.2 | — | — | 0.2 | — | — | 0.2 | — | — | 0.2 | — | — |
| IRR Black 2 | — | 1 | 1 | — | 1 | 1 | — | 0.5 | 0.5 | — | 0.5 | 0.5 | — | 0.5 | 0.5 | — | 0.5 | 0.5 |
| Org. Color. 1 | — | — | 0.3 | — | — | 0.3 | — | — | 0.15 | — | — | 0.15 | — | — | 0.15 | — | — | 0.15 |
| Org. Color. 2 | — | — | 0.3 | — | — | 0.3 | — | — | 0.15 | — | — | 0.15 | — | — | 0.15 | — | — | 0.15 |
| L* | 4.5 | 14.8 | 6.2 | 7.7 | 20.1 | 9.7 | 2.1 | 12.0 | 5.3 | 2.2 | 12.5 | 5.1 | 3.2 | 12.9 | 4.6 | 15.6 | 25.8 | 18.1 |
| Delta L* | — | 10.3 | 1.7 | — | 12.4 | 2.0 | — | 9.9 | 3.1 | — | 10.4 | 3.0 | — | 9.8 | 1.5 | — | 10.1 | 2.4 |
| HBU, °C. | 41 | 31 | 31 | 39 | 31 | 29 | 40 | 31 | 31 | 41 | 31 | 31 | 40 | 33 | 34 | 39 | 33 | 30 |
| TSR, % | 5 | 25 | 24 | 5 | 26 | 26 | 5 | 24 | 24 | 5 | 24 | 24 | 5 | 24 | 24 | 6 | 24 | 26 |

The results in Table 4 demonstrate that Examples 3-8 comprising at least one inorganic infrared reflecting pigment and at least one organic colorant have a very good combination of low HBU and low value for L*. Comparative examples containing at least one inorganic infrared reflecting pigment but no organic colorant both show higher value for L* than Examples 3-8. Comparative examples containing only conventional carbon black colorant all show higher values for HBU than Examples 3-8.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A weatherable composition comprising: (i) at least one resin selected from the group consisting of (i-a1) an acrylonitrile-styrene-acrylate (ASA) graft copolymer, (i-a2) an acrylate-modified ASA, (i-b1) a copolymer comprising carbonate structural units derived from bisphenol A and ester structural units derived from a mixture of isophthalic acid, terephthalic acid, and resorcinol, (i-b2) a copolymer comprising carbonate structural units derived from bisphenol A and dimethyl siloxane structural units, (i-c1) a blend comprising a bisphenol-A polycarbonate and a polyester selected from the group consisting of poly(butylene terephthalate), poly(ethylene terephthalate), poly(cyclohexanedimethanol-ethylene glycol terephthalate), poly(cyclohexylenedimethylene-cyclohexanedicarboxylate), and a polyester with structural units derived from a mixture of isophthalic acid, terephthalic acid, and resorcinol; and (i-c2) a blend comprising a bisphenol-A polycarbonate and a rubber modified thermoplastic resin selected from the group consisting of ABS, ASA, and MMA-ASA; and (ii) a colorant combination consisting of an inorganic infrared reflecting pigment and at least two organic colorants, wherein the inorganic infrared reflecting pigment is selected from the group consisting of a chromium iron oxide, a black spinel, and chrome iron nickel black spinel, and is present in an amount greater than or equal to about 0.02 parts per hundred parts resinous components by weight (phr), and wherein the organic colorants consist of Solvent Green 3, Solvent Red 135, and optionally at least one colorant selected from the group consisting of Solvent Violet 13, Pigment Blue 15:4, Pigment Black 31, and Disperse Violet 31/26, wherein the organic colorants are present in a total amount greater than or equal to about 0.002 phr;

and wherein the combination of the inorganic pigment and organic colorant results in a molded part with a heating build-up (HBU) as measured according to ASTM D4803-89 of less than or equal to about 34° C. and an L* value of less than about 30 with specular component included or less than about 20 with specular component excluded.

2. The composition of claim 1, wherein the composition containing the ASA or acrylate-modified ASA resin further contains a copolymer comprising structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate.

3. The composition of claim 1, further comprising an additive selected from the group consisting of lubricants, neutralizers, stabilizers, heat stabilizers, light stabilizers, antioxidants, UV screeners, UV absorbers, and mixtures thereof.

4. An article made from the composition of claim 1.

5. A method for preparing a weatherable article comprising at least one resin selected from the group consisting of (i-a1) an acrylonitrile-styrene-acrylate (ASA) graft copolymer, (i-a2) an acrylate-modified ASA, (i-b1) a copolymer comprising carbonate structural units derived from bisphenol A and ester structural units derived from a mixture of isophthalic acid, terephthalic acid, and resorcinol, (i-b2) a copolymer comprising carbonate structural units derived from bisphenol A and dimethyl siloxane structural units, (i-c1) a blend comprising a bisphenol-A polycarbonate and a polyester selected from the group consisting of poly(butylene terephthalate), poly(ethylene terephthalate), poly(cyclohexanedimethanol-ethylene glycol terephthalate), poly(cyclohexylenedimethylene-cyclohexanedicarboxylate), and a polyester with structural units derived from a mixture of isophthalic acid, terephthalic acid, and resorcinol; and (i-c2) a blend comprising a bisphenol-A polycarbonate and a rubber modified thermoplastic resin selected from the group consisting of ABS, ASA, and MMA-ASA, wherein the article has a heating build-up (HBU) as measured according to ASTM D4803-89 of less than or equal to about 34° C. and an L* value of less than about 30 with specular component included or less than about 20 with specular component excluded;

which method comprises the step of combining the resin with a colorant combination consisting of an inorganic infrared reflecting pigment and at least two organic colorants, wherein the inorganic infrared reflecting pigment is selected from the group consisting of a chromium iron oxide, a black spinel, and chrome iron nickel black spinel, and is present in an amount greater than or equal to about 0.02 phr;

and wherein the organic colorants consist of Solvent Green 3, Solvent Red 135, and optionally at least one colorant selected from the group consisting of Solvent Violet 13, Pigment Blue 15:4, Pigment Black 31, and Disperse Violet 31/26, wherein the organic colorants are present in a total amount greater than or equal to about 0.002 phr.

6. The method of claim 5, wherein the composition containing the ASA or acrylate-modified ASA resin further contains a copolymer comprising structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate.

7. The method of claim 5, further comprising an additive selected from the group consisting of lubricants, neutralizers, stabilizers, heat stabilizers, light stabilizers, antioxidants, UV screeners, UV absorbers, and mixtures thereof 8. The composition of claim 2, wherein the copolymer comprises structural units derived from alpha-methyl styrene.

9. The method of claim 6, wherein the copolymer comprises structural units derived from alpha-methyl styrene.

10. A weatherable composition consisting essentially of: (i) at least one resin selected from the group consisting of (i-a1) an acrylonitrile-styrene-acrylate (ASA) graft copolymer, (i-a2) an acrylate-modified ASA, (i-b1) a copolymer comprising carbonate structural units derived from bisphenol A and ester structural units derived from a mixture of isophthalic acid, terephthalic acid, and resorcinol, (i-b2) a copolymer comprising carbonate structural units derived from bisphenol A and dimethyl siloxane structural units, (i-c1) a blend comprising a bisphenol-A polycarbonate and a polyester selected from the group consisting of poly(butylene terephthalate), poly(ethylene terephthalate), poly(cyclohexanedimethanol-ethylene glycol terephthalate), poly(cyclohexylenedimethylene-cyclohexanedicarboxylate), and a polyester with structural units derived from a mixture of isophthalic acid, terephthalic acid, and resorcinol; and (i-c2) a blend comprising a bisphenol-A polycarbonate and a rubber modified thermoplastic resin selected from the group consisting of ABS, ASA, and MMA-ASA;

(ii) a colorant combination consisting of an inorganic infrared reflecting pigment and at least two organic colorants, wherein the inorganic infrared reflecting pigment is selected from the group consisting of a chromium iron oxide, a black spinel, and chrome iron nickel black spinel, and is present in an amount greater than or equal to about 0.02 parts per hundred parts resinous components by weight (phr), and wherein the organic colorants consist of Solvent Green 3, Solvent Red 135, and optionally at least one colorant selected from the group consisting of Solvent Violet 13, Pigment Blue 15:4, Pigment Black 31, and Disperse Violet 31/26, wherein the organic colorants are present in a total amount greater than or equal to about 0.002 phr;

and wherein the combination of the inorganic pigment and organic colorant results in a molded part with a heating build-up (HBU) as measured according to ASTM D4803-89 of less than or equal to about 34° C. and an L* value of less than about 30 with specular component included or less than about 20 with specular component excluded; and (iii) an additive selected from the group consisting of lubricants, neutralizers, stabilizers, heat stabilizers, light stabilizers, antioxidants, UV screeners, UV absorbers, and mixtures thereof;

wherein any composition containing the ASA or acrylate-modified ASA resin may optionally further contain (iv) a copolymer comprising structural units derived from styrene and acrylonitrile; alpha-methylstyrene and acrylonitrile; alpha-methylstyrene, styrene, and acrylonitrile; styrene, acrylonitrile, and methyl methacrylate; alpha-methyl styrene, acrylonitrile, and methyl methacrylate; or alpha-methylstyrene, styrene, acrylonitrile, and methyl methacrylate.

11. The composition of claim 1, wherein the total amount of organic colorant present is in a range of 0.002-2.5 phr.

12. The method of claim 5, wherein the total amount of organic colorant present is in a range of 0.002-2.5 phr.

13. The composition of claim 10, wherein the total amount of organic colorant present is in a range of 0.002-2.5 phr.

14. The composition of claim 1, wherein the total amount of IRR pigment present is in a range of 0.04-4.0 phr 15. The method of claim 5, wherein the total amount of IRR pigment present is in a range of 0.04-4.0 phr.

16. The composition of claim 10, wherein the total amount of IRR pigment present is in a range of 0.04-4.0 phr.

* * * * *